United States Patent [19]

Laninga

[11] Patent Number: 5,344,296

[45] Date of Patent: Sep. 6, 1994

[54] METHOD AND APPARATUS FOR FORMING A RUNNER IN A MOLD ASSEMBLY

[75] Inventor: Albert J. Laninga, Tempe, Ariz.

[73] Assignee: Motorola, Inc., Schaumburg, Ill.

[21] Appl. No.: 85,792

[22] Filed: Jul. 6, 1993

[51] Int. Cl.$^5$ .............................................. B29C 45/14
[52] U.S. Cl. ...................................... 425/121; 29/436; 249/95; 264/219; 264/272.17; 425/117; 425/127; 425/DIG. 44
[58] Field of Search ....... 425/117, 121, 127, DIG. 44, 425/DIG. 47; 264/219, 272.17; 29/434, 436; 249/95

[56] References Cited

U.S. PATENT DOCUMENTS

| | | | |
|---|---|---|---|
| 3,372,436 | 3/1968 | Davis | 425/DIG. 44 |
| 3,641,254 | 2/1972 | Bunting et al. | 264/272.17 |
| 4,044,984 | 8/1977 | Shimizu et al. | 425/127 |
| 4,442,056 | 4/1984 | Slepcevic | 425/121 |
| 4,568,962 | 2/1986 | Kalfus | 357/72 |
| 5,059,105 | 10/1991 | Baird | 425/121 |
| 5,118,271 | 6/1992 | Baird et al. | 425/127 |

FOREIGN PATENT DOCUMENTS 1360997  12/1987  U.S.S.R. ............ 425/DIG. 44

Primary Examiner—Jay H. Woo
Assistant Examiner—Robert B. Davis
Attorney, Agent, or Firm—Rennie William Dover

[57] ABSTRACT

A method and apparatus for forming runners (47, 56) in a mold assembly (10, 50). The mold assembly (10, 50) has a cavity plate (11, 51) and a sealing plate (12, 52). The sealing plate (12, 52) has a sealing plate cavity (18) in which a resilient material (14) is placed. A floating seal (13) is movably mounted to the sealing plate (12) such that the floating seal (13) is on the resilient material (14). A workpiece (19) is placed on the resilient material (14) and the cavity plate (11, 51) is mated with the floating seal (13) thereby forming the runners (47, 56). The resilient material (14) imparts a force on the floating seal (13) and pushes the floating seal (13) against the cavity plate (11, 51) to prevent leakage of encapsulating material from the runners (47, 56).

20 Claims, 3 Drawing Sheets

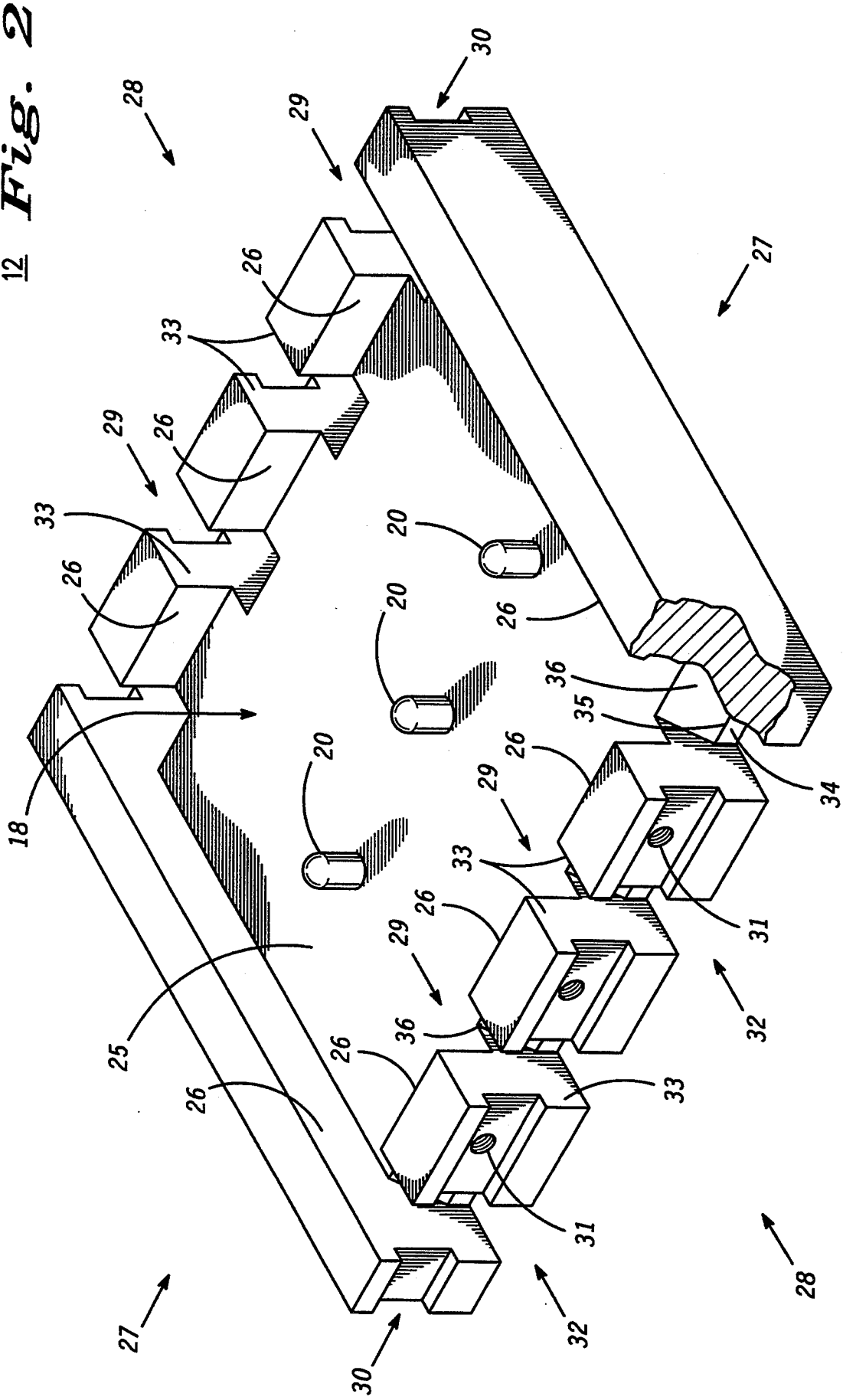

METHOD AND APPARATUS FOR FORMING A RUNNER IN A MOLD ASSEMBLY

BACKGROUND OF THE INVENTION

The present invention relates, in general, to mold assemblies, and more particularly, to a method and apparatus for forming a runner in a mold assembly.

Workpieces, such as semiconductor devices, are encapsulated to protect them from becoming damaged by mechanical stresses, moisture, or the like. In parting plane mold assemblies, encapsulation is accomplished by placing a workpiece in a first section of a mold assembly and mating the first section with a second section, wherein the step of mating encloses the workpiece in a mold cavity and forms a plurality of runners extending from the mold cavity. Subsequently, an encapsulation material, commonly referred to as a molding compound, is injected through the plurality of runners into the mold cavity, thereby encapsulating the workpiece.

Although this technique has been useful for encapsulating workpieces, it requires machining the mold assembly sections and forming the workpieces to exacting tolerances. A particularly critical problem in parting plane mold assemblies is manufacturing the mold sections so that there are no spaces or gaps along the mating surfaces. Spaces or gaps prevent proper sealing between the mold sections and allow seepage of the encapsulation material from runners formed when the mold sections are mated, i.e., the formation of flash. In addition, workpieces whose dimensional variations exceed specified limits may also cause flash formation by preventing the proper sealing of the runners. Since additional processing steps are required to remove the flash, dimensional variations of either the mold assembly or the workpieces increases the costs associated with encapsulating workpieces.

Accordingly, it would be advantageous to have a method and apparatus for forming a runner in a mold assembly that eliminates flash formation. The method and apparatus should create a seal between two mold sections by imparting a uniform pressure along a parting plane formed by mating the two mold sections. It would be of further advantage for the method and apparatus to prevent flash formation by compensating for dimensional variations of the components of the mold assembly or the workpieces.

SUMMARY OF THE INVENTION

Briefly stated, the present invention provides a method and apparatus for forming a runner in a mold assembly. A first step in the method for forming the runner in accordance with the present invention is providing a mold assembly having a cavity plate and a sealing plate, the sealing plate having a sealing plate cavity. A resilient material is placed in the sealing plate cavity followed by mounting at least one floating seal to the sealing plate. Subsequently, the method entails mating the cavity plate with the at least one floating seal wherein the runner is formed between the cavity plate and the at least one floating seal.

In yet another aspect of the present invention, the mold assembly comprises a mold having a cavity plate and a sealing plate wherein the sealing plate has a recess in which a resilient material is placed. A floating seal is movably mounted to the sealing plate.

BRIEF DESCRIPTION OF THE DRAWINGS

FIG. 2 illustrates a perspective view of a sealing plate of the mold assembly of FIG. 1;

DETAILED DESCRIPTION OF THE DRAWINGS

Figure 1:
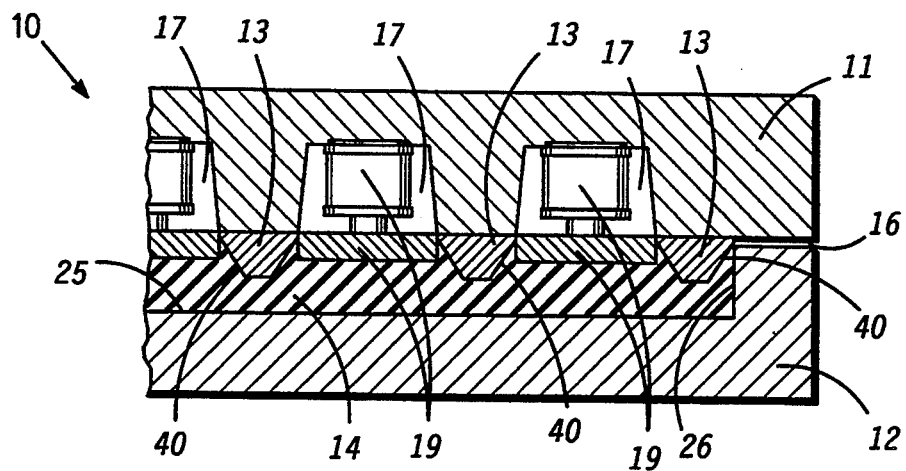
FIG. 1 illustrates a highly simplified cross-sectional view of a portion of an embodiment of a mold assembly in accordance with the present invention.

A highly simplified cross-sectional view of an embodiment of a mold assembly 10 in a closed configuration is illustrated in FIG. 1. Mold assembly 10 is defined as being in a closed configuration when a cavity plate 11 is mated with floating seals 13 thereby forming enclosed mold cavities 17. Mold assembly 10 is defined as being in an open configuration when cavity plate 11 is separated from floating seals 13. Although the embodiment illustrated in FIG. 1 is particularly suited for forming high power semiconductor device packages, it shall be understood that the present invention is generally useful for forming runners in parting plane injected mold assemblies.

Mold assembly 10 is comprised of a cavity plate 11, a sealing plate 12, a sheet of resilient material 14, and a plurality of floating seals 13, wherein the plurality of floating seals 13 have beveled sides 40. Cavity plate 11 has a plurality of cavities 17 whereas sealing plate 12 has a single cavity or recess, also referred to as a sealing plate cavity, and is denoted by reference numeral 18 in FIG. 2. The plurality of cavities 17 are shaped to receive portions of workpieces 19. Workpieces 19 are placed or positioned on sheet of resilient material 14 such that they are adjacent to and spaced apart from floating seals 13. Subsequently, workpieces 19 are enclosed within mold cavities 17 by mating cavity plate 11 with floating seals 13. In FIG. 1, workpieces 19 are heat sink assemblies similar to those described in U.S. Pat. No. 4,568,962 issued to Kalfus on Feb. 4, 1986, and which is hereby incorporated herein by reference. However, it will be understood that mold assembly 10 can be used to encapsulate other types or shapes of workpieces or semiconductor devices by simply modifying cavities 17. Further, the same reference numerals are used to denote the same elements in each of the figures.

Sheet of resilient material 14 is patterned to fit on floor 25 of sealing plate 12, and placed in sealing plate cavity 18. Sheet of resilient material 14 covers floor 25 and fits snugly against lips 26. The thickness of layer of resilient material 14 is selected such that cavity plate 11 and sealing plate 12 do not contact or touch each other when mold assembly 10 is in a closed configuration. In other words, in a closed configuration, cavity plate 11 and sealing plate 12 are spaced apart from one another, i.e., a gap 16 exists between plates 11 and 12. Further, sheet of resilient material 14 may have holes (not shown) through which optional alignment pins 20 (FIG. 2) are inserted. Preferably, sheet of resilient material 14 is a rubber having a hardness of approximately 50 durometers.

FIG. 2 illustrates a perspective view of sealing plate 12 in accordance with the present invention. Sealing plate 12 is a rectangular shaped structure having a major surface or floor 25. A wall or lip 26 extends upward from a periphery of floor 25 forming sealing plate cavity 18. The portions of lip 26 extending upward along opposing edges 27 of sealing plate 12 are continuous structures, whereas the portions of lip 26 extending upward along opposing edges 28 of sealing plate 12 have gaps 29 which give the portions of lip 26 extending upward along opposing edges 28 a battlement-like appearance, wherein gaps 29 are analogous to crenels. In other words, the portions of lip 26 extending upward along opposing edges 28 are interspersed with a plurality of gaps or slots 29.

Gaps 29 in the portions of lip 26 associated with a first of the two opposing edges 28 are aligned with corresponding gaps 29 in the portions of lip 26 associated with a second of the two opposing edges 28. Further, gaps 29 extend through floor 25 into sealing plate 12 thereby forming notches 32 in opposing edges 28. Each notch 32 has two opposing sidewalls 33, and a backwall 34 perpendicular to sidewalls 33. Backwalls 34 have a top edge 35. In one embodiment, sealing plate 12 has a plurality of beveled portions 36, wherein each beveled portion 36 extends from top edge 35 to floor 25. In another embodiment (illustrated in FIG. 5), sealing plate 12 has a plurality of step shaped portions 57, wherein each step shaped portion 57 extends from top edge 35 to floor 25. Beveled and step shaped portions 36 and 57, respectively, promote sealing of surfaces 38 associated with ends 41 and 43 of floating seal 13 (FIG. 3), as will be described with reference to FIGS. 4 and 5.

Optional alignment pins 20 are positioned between lips 26, and serve to align or position workpieces 19 within mold assembly 10. Optional alignment pins 20 extend upward from floor 25 and mate with alignment holes (not shown) in workpieces 19. In addition, opposing edges 28 include C-shaped recesses 30 and threaded screw holes 31 which cooperate with a retainer bar 53 (FIG. 4) to movably fasten floating seals 13 to sealing plate 12. C-shaped recesses 30, screw holes 31, retainer bars 53, and the fastening of floating seals 13 to sealing plate 12 are further discussed with reference to FIG. 4.

Figure 3:
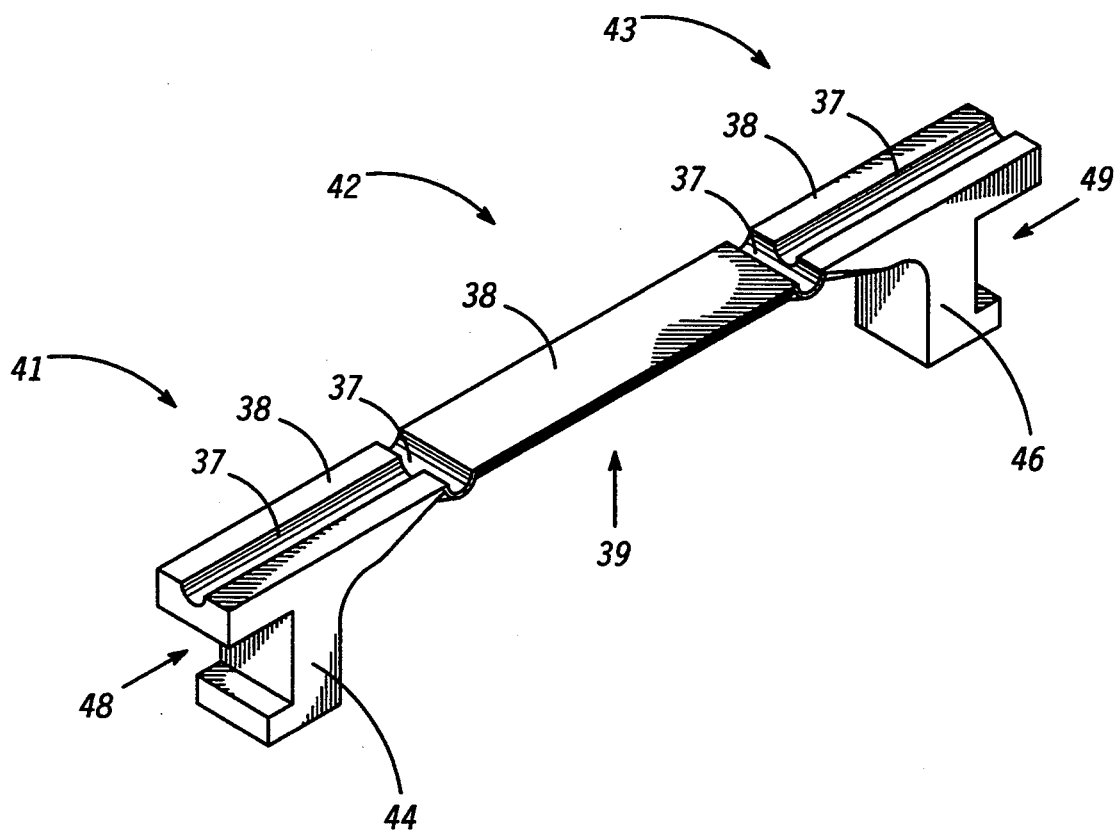
FIG. 3 illustrates a perspective view of a floating seal of the mold assembly of FIG. 1.

FIG. 3 illustrates a perspective view of one floating seal 13 in accordance with the present invention. Each floating seal 13 is a unitary structure adapted to mate with sealing plate 12. Thus, each floating seal 13 has a first end 41, a second end 43, and a central portion 42 therebetween. Further, each floating seal 13 has a sealing surface 38 for mating with cavity plate 11 and a support surface 39 for mating with resilient material 14. A first foot 44 extends from a portion of support surface 39 which is proximal to first end 41. A second foot 46 extends from a portion of support surface 39 which is proximal to second end 43. First and second feet 44 and 46, respectively, are L-shaped and form first and second recesses 48 and 49, respectively, such that an opening or mouth of first recess 48 and an opening or mouth of second recess 49 face in opposite directions. In the embodiment of FIG. 3, the intersection of the backsides of feet 44 and 46 (i.e., the sides opposite recesses 48 and 49) and support surface 39 form a radial shape. In yet another embodiment (not shown), a bevel shape is formed at the intersection of the backsides of feet 44 and 46 and support surface 39. The radial shape and the bevel shape serve to mate with bevel 36 of FIG. 2 or steps 57 of FIG. 5. Further, edges 40 of central portion 42 are beveled from sealing surface 38 to support surface 39 as illustrated in FIG. 1. Preferably, floating seals 13 are made of steel.

Optional grooves or recesses 37 in rectangular sealing surface 38 are also illustrated in FIG. 3. Grooves 37 form conduits which serve as runners when cavity plate 11 is mated with floating seals 13. Preferably, grooves 37 are in a T-shape to channel fluid flow to each side of floating seal 13 during an encapsulation step.

Figure 4:
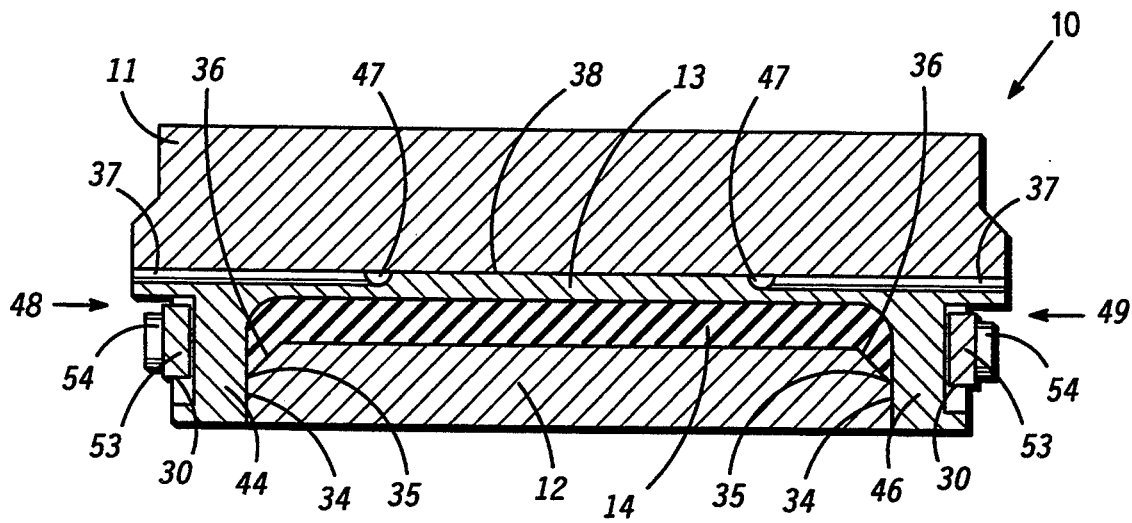
FIG. 4 illustrates a cross-sectional view in a direction perpendicular to the cross-sectional view of the mold assembly shown in FIG. 1.

FIG. 4 illustrates a cross-sectional view of mold assembly 10 in a direction perpendicular to the cross-sectional view shown in FIG. 1. Mold assembly 10 of FIG. 4 illustrates floating seal 13 mounted to sealing plate 12. Referring now to FIGS. 2 and 3, floating seal 13 is mounted to sealing plate 12 such that first foot 44 is between opposing sidewalls 33 and abuts backwall 34 of the first of the two opposing edges 28, and second foot 46 is between opposing sidewalls 33 and abuts backwall 34 of the second of the two opposing edges 28. Referring again to FIG. 4, one retainer bar 53 is positioned or inserted in C-shaped recesses 30 and 48, and is subsequently fastened to sealing plate 12. Another retainer bar 53 is positioned or inserted in C-shaped recesses 30 and 49, and is subsequently fastened to sealing plate 12. In one embodiment, retainer bars 53 have vertically elongated unthreaded screw holes (not shown) and are removably fastened to sealing plate 12 by inserting screws 54 through the unthreaded vertically elongated screw holes and screwing screws 54 into threaded screw holes 31. The unthreaded elongated screw holes allow movement of retainer bars 53 in a direction normal to floor 25, i.e., retainer bars 53 move toward cavity plate 11 and away from sealing plate 12 or toward sealing plate 12 and away from cavity plate 11. Consequently, floating seals 13 are also able to move in a direction normal to floor 25. Thus floating seals 13 are movably mounted to sealing plate 12. Lateral movement of retainer bars 53 is limited by opposing sidewalls 33 and backwalls 34 (FIG. 2). By way of example, opposing sidewalls 33 are spaced apart by 9.52 centimeters and the maximum width of floating seal 13, is 9.50 centimeters. Thus, lateral movement of floating seals is essentially prevented.

It shall be understood that the method for fastening retainer bars 53 to sealing plate 12 is not limited to using screws in conjunction with threaded and unthreaded screw holes. For example, retainer bars 53 may be fastened to sealing plate 12 using vertically elongated slots in sealing plate 12, wherein the vertically elongated slots may have lips which serve as stops for keepers. A screw or bolt is inserted through the holes or slots in retainer bar 53 and into the vertically elongated slots in sealing plate 12. The screw or bolt may be screwed into a nut which serves as a keeper. Likewise, the screw or bolt may have an expandable end which expands once positioned in the vertically elongated slot such that the expanded portion serves as a keeper. The keeper cooperates with the lip to hold the screw or bolt in the vertically elongated slot. Further, the keeper is designed to loosely hold the screw or bolt thereby allowing floating seal 13 to move in a direction normal to major surface 25. Other examples of methods and apparatus for fastening retainer bars 13 to sealing plate 12 include vertically elongated slots with clips, clamps, rivets, or the like, which cooperate to hold retainer bars 53 in C-shaped recesses 30, and in recesses 48 and 49.

In addition, FIG. 4 illustrates an embodiment wherein runners 47 are formed by mating cavity plate 11 with floating seals 13. More particularly, cavity plate 11 has a flat surface which is pressed against sealing surfaces 38 of floating seals 13. Sealing surfaces 38 have grooves 37 that form conduits which serve as the runners 47 when cavity plate 11 and sealing surfaces 38 are pressed against each other, i.e., when the flat surface of cavity plate 11 and sealing surfaces 38 abut one another.

Figure 5:
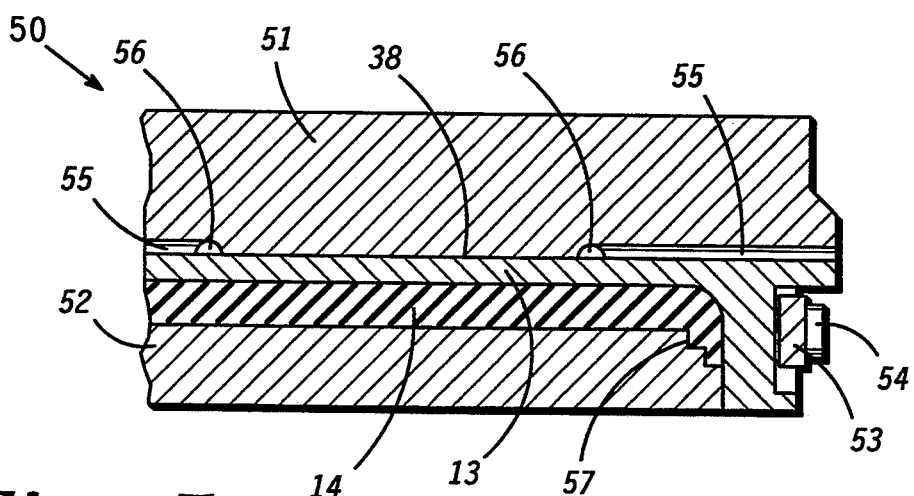
FIG. 5 illustrates a cross-sectional view of another embodiment of a mold assembly in accordance with the present invention.

FIG. 5 is a cross-sectional view of a mold assembly 50 that illustrates another embodiment of the present invention, wherein a cavity plate 51 has grooves or recesses 55 that extend from a surface of cavity plate 51 into cavity plate 51. In the embodiment of FIG. 5, grooves 37 are absent from floating seals 13. Thus grooves 55 form conduits which serve as runners 56 when cavity plate 11 is mated with floating seals 13. In yet another embodiment (not shown), grooves 37 are formed in floating seals 13 and corresponding grooves 55 are formed in cavity plate 51. Mating cavity plate 51 with floating seal 13 aligns grooves 37 with corresponding grooves 55 to form runners. Runners 47 and 56 may serve as conduits for molding compound or as vents to allow for pressure relief during the encapsulation or molding process.

In addition, FIGS. 4 and 5 illustrate the sealing of the mold assembly along beveled portions 36 of sealing plate 12 and step portions 57 of sealing plate 52, respectively. Portions 36 and 57 form an integral feature of the present invention in that they induce resilient material 14 to press or push ends 41 and 43 against cavity plate 11, thereby forming a seal between the portions of sealing surfaces 38 of ends 41 and 43 and cavity plate 11. In other words, the step of pressing cavity plate 11 against floating seals 13, i.e., mating cavity plate 11 with floating seals 13, pushes floating seals 13 into layer of resilient material 14, which in turn expands (through compression) and seals the spaces or gaps between workpieces 19 and floating seals 13. Further, layer of resilient material 14 applies a force or a pressure to floating seals 13 thereby pushing floating seals 13 into cavity plate 11. The force applied to floating seals 13 by layer of resilient material 14 includes a perpendicular component and a lateral component. The perpendicular component is in a direction normal to support surface 39 whereas the lateral component is towards the first and second ends 41 and 43, respectively. The lateral component is influenced by beveled portions 36 (shown in FIG. 4) or by step shaped portions 57 (shown in FIG. 5) and exerts a rotational force to support surface 39, thereby pushing sealing surface 38 against cavity plate 11. More particularly, the rotational force pushes portions of sealing surfaces 38 of ends 41 and 43 against cavity plate 11. Likewise, the perpendicular component pushes the portion of sealing surface 38 of central portion 42 against cavity plate 11.

Thus, compressing the resilient material creates a force which is exerted by resilient material 14 on floating seals 13. The force created by resilient material 14 ensures that cavity plates 11 or 12 are mated with floating seals 13 such that there is a uniform pressure along a parting plane formed between cavity plates 11 or 51, and floating seals 13, i.e., a uniform pressure is created along the interface between cavity plates 11 or 51, and floating seals 13. Further, the seal prevents molding compound from seeping out of the runners during the encapsulation step, i.e., the seal prevents flash formation. It shall be understood that floating seals 13 have sufficient plasticity so that the forces exerted on floating seals 13 in conjunction with the pliability of resilient material 14 enable floating seals 13 to conform to the surface of cavity plate 11 when the surface of cavity plate 11 has a slight bow or warpage. Providing layer of resilient material 14 of sufficient thickness to prevent plates 11 and 12 from touching reduces the effects that dimensional variations of mold assembly 10 and workpieces 19 have on the seal between cavity plate 11 and floating seals 13. It shall be understood that the description of the mating of cavity plate 11 to floating seals 13 also applies to cavity plate 51.

By now it should be appreciated that a method and apparatus have been provided for sealing a mold assembly by using a cavity plate and a floating seal such that a portion of a mold cavity is sealed during an encapsulation step, thereby allowing formation of a runner. The method and apparatus take advantage of a floating or movable floating seal, i.e., a floating seal, in conjunction with the elasticity of a layer of resilient material. These properties decrease the strict tolerances on the mold assembly or the workpiece to be encapsulated, thereby allowing increased dimensional variations for both the mold assembly and the workpiece.

Further, the floating seal is movable in a vertical direction allowing the formation of a continuous unbroken seal along the runners. The elasticity of the layer of resilient material and the ability of the floating seal to move ensures formation of a seal with equal pressures on both sides of a parting plane, i.e., it allows equal pressure on both the inside and the outside of the parting plane. Moreover, the layer of resilient material is of sufficient thickness to create a gap between the cavity plate and the sealing plate thereby reducing the effects of dimensional variations of the mold assembly and the workpieces on the seal formed between the mold assembly and the workpieces.

Although an embodiment particularly suited for forming high power semiconductor device packages has been described, it shall be understood that the present invention is generally useful for forming runners in parting plane mold assemblies. For example, floating seal 13 may be modified for the grooves to form runners for other package types such as a TO-220 package. Additionally, sealing plate 12 may be formed with a fewer or a greater number of gaps 29 in lip 26 extending upward along opposing edges 28. Thus, improvements will occur to those skilled in the art. It is understood that the invention is not limited to the particular forms shown and it is intended for the appended claims to cover all modifications which do not depart from the spirit and scope of this invention.

I claim:

1. A method for forming a runner in a mold assembly, Comprising the steps of:

providing the mold assembly, wherein the mold assembly has a cavity plate and a sealing plate, the sealing plate having a sealing plate cavity;

placing a resilient material in the sealing plate cavity;

mounting at least one floating seal to the sealing plate; and mating the cavity plate with the at least one floating seal thus forming the runner between the cavity plate and the at least one floating seal.

2. A method for forming a runner in a mold assembly as claimed in claim 1, wherein the step of providing the mold assembly includes providing the cavity plate with a groove, and using the groove to form a conduit which serves as the runner when the cavity plate is mated with the at least one floating seal.

3. A method for forming a runner in a mold assembly as claimed in claim 1, wherein the step of mounting at least one floating seal to the sealing plate includes providing the at least one floating seal with a groove, and using the groove to form a conduit which serves as the runner when the cavity plate is mated with the at least one floating seal.

4. A method for forming a runner in a mold assembly as claimed in claim 1, further including providing the at least one floating seal as a structure having a first end separated from a second end by a central portion, a sealing surface for mating with the cavity plate, a support surface for mating with the resilient material, a first foot proximal to the first end and extending from the support surface, a second foot proximal to the second end and extending from the support surface, wherein the first and second feet are L-shaped and form first and second recesses, respectively, the first and second recesses having openings that face in opposite directions.

5. A method for forming a runner in a mold assembly as claimed in claim 4, wherein the step of mounting at least one floating seal to the sealing plate comprises:
providing at least two retainer bars, wherein a first retainer bar is adapted to mate with the first recess, and a second retainer bar is adapted to mate with the second recess;
inserting the first retainer bar in the first recess;
inserting the second retainer bar in the second recess; and
fastening the at least two retainer bars to the sealing plate.

6. A method for forming a runner in a mold assembly as claimed in claim 1, further including providing the resilient material of a sufficient thickness that the cavity plate and the sealing plate are spaced apart when the cavity plate is mated with the at least one floating seal.

7. A method for forming a runner in a mold assembly as claimed in claim 1, further including forming the at least one floating seal from steel.

8. A method for forming a runner in a mold assembly as claimed in claim 1, further including providing the sealing plate as a rectangular shaped structure having a major surface and a lip extending upward along a periphery of the major surface, wherein a portion of the lip extending upward along two opposing edges of the periphery has a gap in each of the two opposing edges of the periphery, and the sealing plate has a plurality of beveled portions, each beveled portion extending from one of the gaps to the major surface.

9. A method for sealing a mold assembly by using a cavity plate and a floating seal, comprising the steps of:
providing the mold assembly, wherein the mold assembly includes the cavity plate and a sealing plate, the sealing plate having a major surface with a resilient material disposed thereon;
mounting a floating seal to the sealing plate, wherein the floating seal has a sealing surface on one side and a support surface on an opposite side;
placing a workpiece on the resilient material, the workpiece positioned adjacent to and spaced apart from the floating seal; and
compressing the resilient material such that the resilient material applies a force to the floating seal, and pushes the floating seal against the cavity plate.

10. A method for sealing a mold assembly by using a cavity plate and a floating seal as claimed in claim 9, wherein the step of compressing the resilient material comprises contacting the cavity plate with the floating seal and pressing the cavity plate against the floating seal such that there is a uniform pressure along a parting plane formed between the cavity plate and the floating seal.

11. A method for sealing a mold assembly by using a cavity plate and a floating seal as claimed in claim 9, wherein the step of providing the mold assembly includes providing the cavity plate with recesses that extend from a surface of the cavity plate into the cavity plate.

12. A method for sealing a mold assembly by using a cavity plate and a floating seal as claimed in claim 9, wherein the step of mounting a floating seal to the sealing plate further comprises:
providing the floating seal such that the floating seal has two feet extending from the support surface, each foot forming a recess having mouths facing in opposite directions;
inserting a first retainer bar in a mouth of a first recess;
inserting a second retainer bar in a mouth of a second recess; and
fastening each retainer bar to the sealing plate.

13. A method for sealing a mold assembly by using a cavity plate and a floating seal as claimed in claim 9, wherein the step of mounting a floating seal further includes movably mounting the floating seal such that the floating seal is capable of moving in a direction normal to the major surface.

14. A mold assembly, comprising:
a mold having a cavity plate and a sealing plate, the sealing plate having a recess;
a resilient material in the recess of the sealing plate; and
a floating seal, the floating seal movably mounted to the sealing plate.

15. A mold assembly as claimed in claim 14, wherein the floating seal has a first end, a second end, and a central portion therebetween, a sealing surface for mating with the cavity plate, a support surface for mating with the resilient material, a first foot proximal to the first end and extending from the support surface, a second foot proximal to the second end and extending from the support surface, wherein the first and second feet are L-shaped and form first and second recesses, respectively, the first and second recesses having openings that face in opposite directions.

16. A mold assembly as claimed in claim 14, wherein the cavity plate includes a recess that forms a runner when the cavity plate is mated with the floating seal.

17. A mold assembly as claimed in claim 14, wherein the floating seal includes a recess that forms a runner when the floating seal is mated with the cavity plate.

18. A mold assembly as claimed in claim 14, wherein the resilient material is rubber and the floating seal is steel.

19. A mold assembly as claimed in claim 14, wherein the sealing plate comprises a rectangular shaped structure that has a major surface and a lip along a periphery of the sealing plate, the lip extends upward from the major surface, a portion of the lip that extends upward along each of two opposing edges of the sealing plate has gaps, and the sealing plate further includes a plurality of beveled portions between the two opposing edges of the sealing plate that have the gaps.

20. A mold assembly as claimed in claim 14, wherein the sealing plate comprises a rectangular shaped structure that has a major surface and a lip along a periphery of the sealing plate, the lip extends upward from the major surface, a portion of the lip that extends upward along each of two opposing edges of the sealing plate has gaps, and the sealing plate further includes a plurality of step shaped portions between the two opposing edges of the sealing plate that have the gaps.

* * * * *